March 3, 1970     W. N. GALLAGHER     3,497,955
DENTAL STATION
Filed Sept. 8, 1966
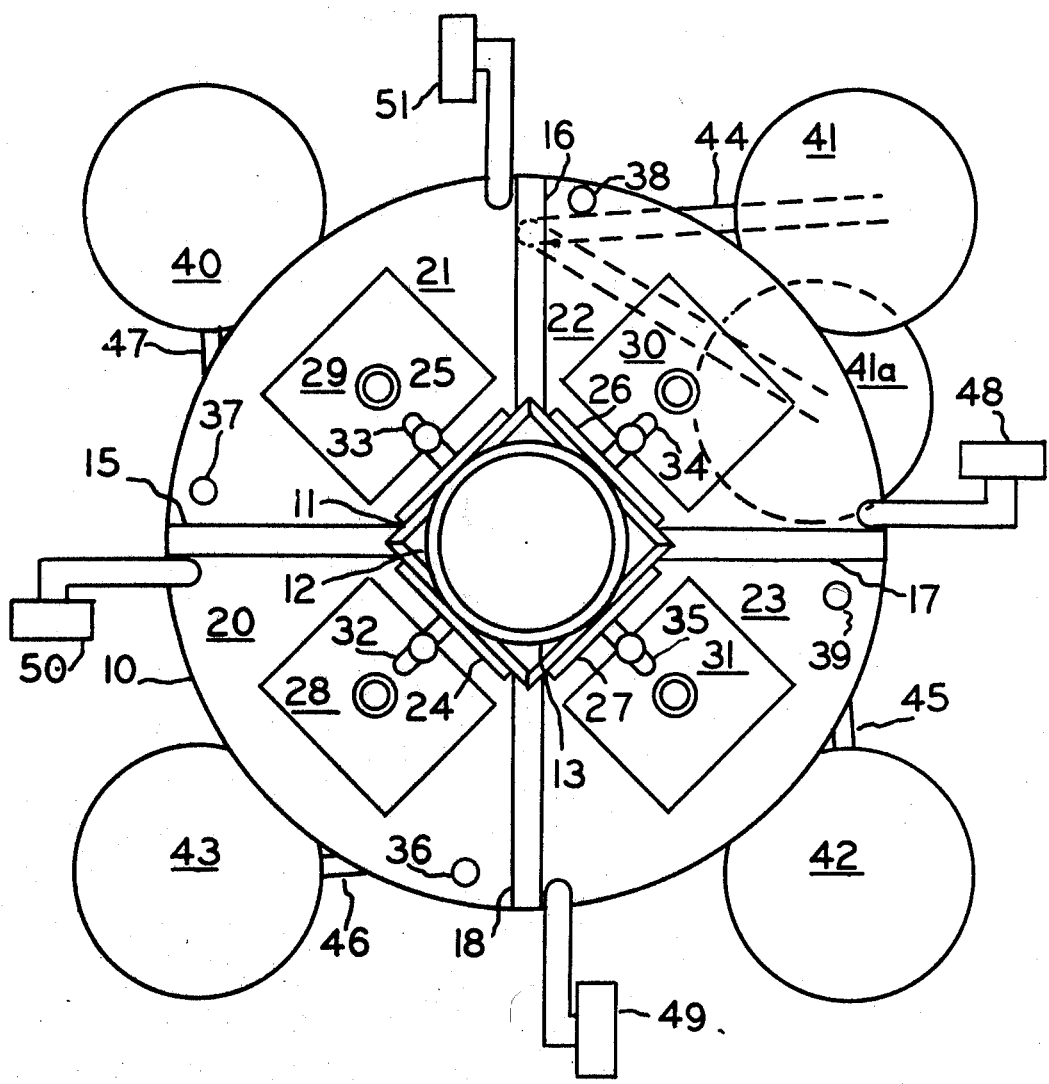
INVENTOR
WALTER N. GALLAGHER
BY
*Richard J. Miller*
ATTY.

United States Patent Office 3,497,955
Patented Mar. 3, 1970

3,497,955
DENTAL STATION
Walter N. Gallagher, 4312 Glenridge St.,
Kensington, Md. 20795
Filed Sept. 8, 1966, Ser. No. 578,438
Int. Cl. A61c 19/02
U.S. Cl. 32—22   6 Claims

ABSTRACT OF THE DISCLOSURE

This invention discloses a unique combination of dental apparatus comprising a compactly designed four unit dental station capable of providing dental care for four patients simultaneously utilizing the services of only one dental technician. The dental station includes a table divided into several parts by partitions, individual seats, and head rests for each part, and a centrally disposed cupola containing the necessary apparatus for concurrently providing several patients with the three agent stannous fluoride treatment.

---

The invention described herein may be manufactured and used by and for the Government of the United States of America for governmental purpose without the payment of any royalties thereon or therefor.

This invention relates to a system of dental care and more particularly to an improved dental station for the application of modern preventive dentistry techniques to a group of patients in a more efficient way.

The value has been established of a three-agent stannous fluoride technique in reducing the incidence of dental caries and the means for implementation of these preventive dentistry measures have been developed. In particular dental care priorities for the operating forces of the Navy and Marine Corps are in existence and directed that all Navy and Marine Corps personnel of the operating forces receive a three-agent stannous fluoride treatment and maximum dental care prior to deployment, or transfer to activities, or areas, where dental support is other than maximum.

The current preventive dentistry program revolves about a preventive dentistry room outfitted with convention dental equipment and lavatory sinks, the latter for use in the self application of stannous fluoride paste, agent 1, is prescribed in the first step of the three-agent technique. The second step involves the seating of the patient in a dental chair for the topical application of stannous fluoride solution, agent 2, by a trained dental technician, and the third step involves the home use of a stannous fluoride dentrifice, agent. 3. Since a limited amount of dental hygiene instructions are essential to insure the success of this program, sufficient compartment space is normally provided for instructing.

Recently it has been found that in many instances a preventive dentistry room cannot be readily integrated into an established dental activity and the use of several spaces remote from one another must be resorted to. This results in a reduction in coordination of treatment and slowing down in the flow of patients through treatment channels; factors that tend to interfere with the operating efficiency of the program.

This invention provides a mobile-type preventive dentistry device to be manned by dental personnel and positionable at any desired location.

Further objects and advantages of this invention are to:
(a) Extend the benefits of the three-agent stannous fluoride treatment to remote areas not having dental facilities;
(b) Supplement fluoride treatments rendered by dental personnel in areas where dental facilities are limited in available space;
(c) Afford a more effective utilization of dentists and dental technicians presently engaged in the preventive dentistry program, thus, creating additional time for other professional tasks;
(d) Augment the capability of facilities to provide the three-agent stannous fluoride treatment on a mass basis and thereby support the long-range objectives of the preventive dentistry program;
(e) Reduce future demands for restorative dental treatment by dentists; and
(f) Contribute to the overall health of the nation.

A further object of this invention is to provide an improved dental station comprising: a table, including a supporting structure capable of being mounted in a horizontal position; a plurality of partitions dividing the table into a plurality of patient stations; individual seats and headrests supported at each patient station and movable between a stored position and a using position; a centrally disposed cupola mounted on said table and forming a part of each patient position; individual sinks, water connection and warm air syringes located at each individual patient station; and means for concurrently providing three-agent stannous fluoride treatment to a patient at each patient station.

Other objects, advantages and novel features of the invention will become apparent from the following detailed description of the invention when considered in conjunction with the accompanying drawings wherein. The figure shows a plan view of one embodiment of the invention.

Conventionl equipment currently in use has the following limitations:
(a) It lacks design to accommodate group instruction and group treatment in one area at one time;
(b) It is bulky and cumbersome, factors to be considered when space is at a premium;
(c) It is expensive, a factor that would be reflected in the initial costs of financing preventive dentistry programs;
(d) It requires trained personnel to provide maintenance and repair services; and
(e) When used in the preventive dentistry treatment rooms, its potential uses in other phases of dentistry is limited.

The table 10 in one successful embodiment is a disc 42 inches in diameter by one inch thick, and is elevated to a height of 34 inches by four legs or supports (not shown). An open-ended cupola 11, is positioned over a centrally positioned perforation 12 in the table top and serves as a stowage space for waste can 13 and utility connections. Radiating peripherally from and secured to the perpendicular margins of the cupola are four partitions 15, 16, 17, 18 which form four equal sized cubicles 20, 21, 22, 23 each consisting of a perforated base and three sides. Each cubicle houses individually a mirror 24, 25, 26, 27, a sink 28, 29, 30, 31, a faucet 32, 33, 34, 35, and a warm air syringe 36, 37, 38, 39.

Mirrors 24, 25, 26, 27 are mounted to the perpendicular surface of the cupola so that their upper margin is flush with that of the cupola. Four perforations in the base are individually positioned equi-distance from the dividers, and into each a sink 28, 29, 30, 31 is submounted to the periphery of this perforation.

All utilities, including compressed air for the air syringe, are connected to their respective outlets by conventional means (not shown). Four seats 40, 41, 42, 43 are individually supported by arms 44, 45, 46, 47 rotatably mounted to table 10 between a stored and a used position. Seat 41 is shown in the stored position by the partly dashed circle 41a. In addition there are provided four head rests 48, 49, 50, 51 pivotally mounted on table 10.

Although the dental station is associated with plans to provide a mobile preventative dentistry room for naval use, its compactness of design permits it to be readily adapted to dental clinics and other health institutions. Clinical use of the disclosed embodiment provides for the rendering of the mass training and application of three-agent stannous fluoride in groups of four. Upon arrival at the clinic, each group is directed to be seated at a station. Upon completion of screening to eliminate patients with gingivitis (gum infections) and/or conditions that might contra-indicate the use of stannous fluoride, each patient is given a disclosing dye in tablet form to be dissolved in his mouth. While waiting for dissolution to take place, the group is instructed on the unorthodox method they are about to use to apply the cariostatic agent to their teeth with a toothbrush. The next ten minutes consists of each patient brushing his teeth with the stannous fluoride paste, checking by mirrors to determine the progress being made on stain removal. Following completion of this step, each patient rotates his body clockwise to allow his head to rest in the cradle of the headrest. Upon opening his mouth a dental department representative isolates the teeth, dries off their surfaces with warm air from the syringe and then applies the stannous fluoride solution with a cotton applicator. The cotton rolls are removed and deposited in the dental waste can located in the cupola. Group instruction on dental home care follows at which time the group is dismissed. The station is policed for cleanliness and the next group of four patients are seated.

Obviously many modifications and variations of the present invention are possible in the light of the above teachings.

I claim:
1. An improved dental station for concurrent training and treatment of a plurality of patients, comprising:
   (a) a table including a supporting structure capable of being mounted in a horizontal position;
   (b) a plurality of partitions dividing said table into a plurality of patient stations;
   (c) individual seats and headrests supported at each patient station and movable between a stored position and a using position;
   (d) a centrally disposed cupola mounted on said table and forming a part of each patient station;
   (e) individual sinks, water connections and warm air syringes located at each individual patient station;
   (f) means for concurrently providing three-agent stannous fluoride treatment to a patient at each patient station, said table providing the necessary support for said seats, headrests, cupola, sinks, water connections and warm air syringes to provide said station the capability of providing treatment to a plurality of patients concurrently, and said water connections, sinks and warm air syringes connected to common sources of water, water disposal and warm air respectively, said supporting structure and table being uniquely adapted for positioning said dental station on a movable platform for providing said dental station with mobility, said supporting structure including means connected to said common sinks, water, water disposal and warm air for coupling to said mobile structure.

2. The improved dental station of claim 1 wherein there are provided means including a plurality of mirrors for individuals receiving the three-agent stannous fluoride treatment to observe the progress of the first step of said treatment.

3. The improved dental station of claim 2 wherein the three-agent stannous fluoride treatment includes instruction in and application of a disclosing dye, a stannous fluoride solution, and a stannous fluoride dentrifice.

4. The improved dental station of claim 1 wherein said table has four patient stations and has a base designed to be self-supporting of said stations and said table.

5. The dental station of claim 4 wherein means for concurrently providing three-agent stannous fluoride treatment includes application of an instruction for a disclosing dye; a stannous fluoride solution; and stannous fluoride dentrifices.

6. The dental station of claim 5 including a mirror for self-determination by individual patients of the progress of said disclosing dye.

References Cited
UNITED STATES PATENTS
2,980,999  4/1961  Behne et al. _____ 32—22

ROBERT PESHOCK, Primary Examiner